June 23, 1970     W. F. KUHLMAN     3,516,517
AIR LUBRICATION SYSTEM
Filed Sept. 9, 1968
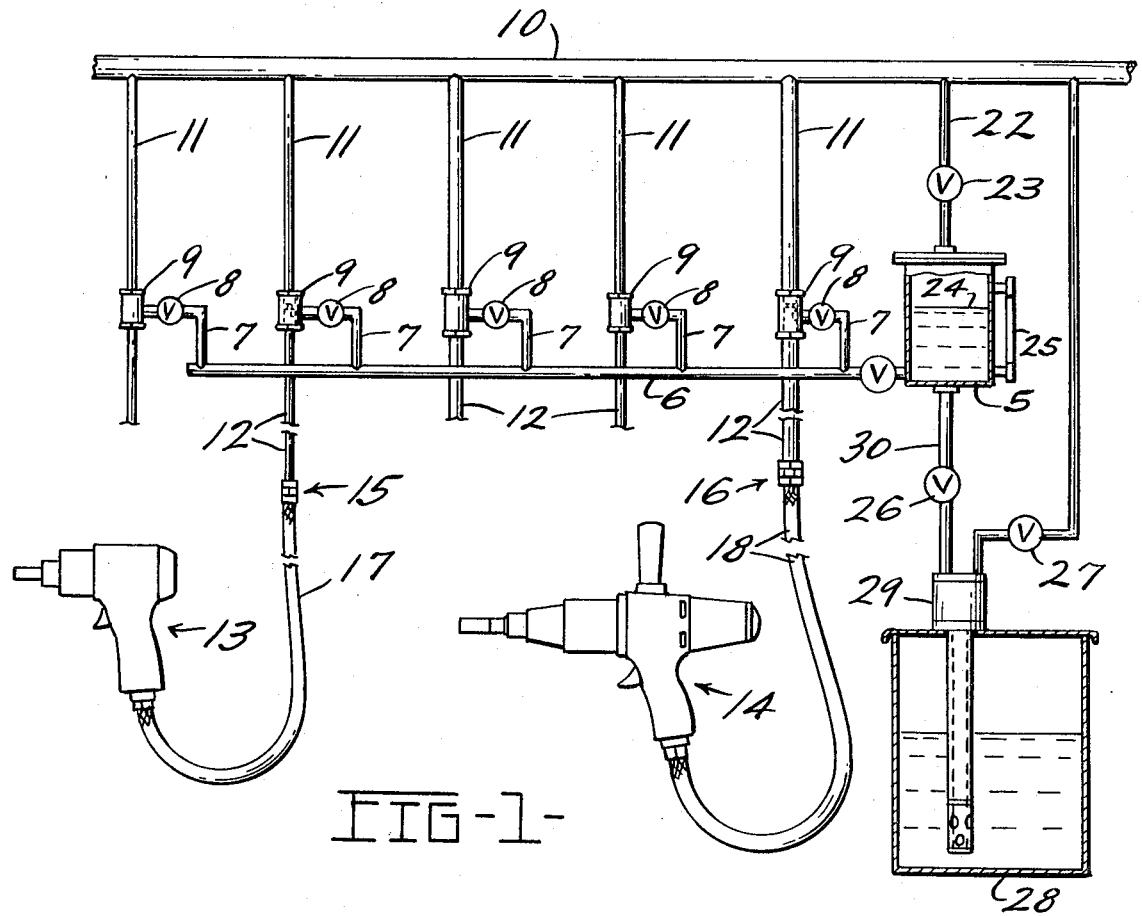
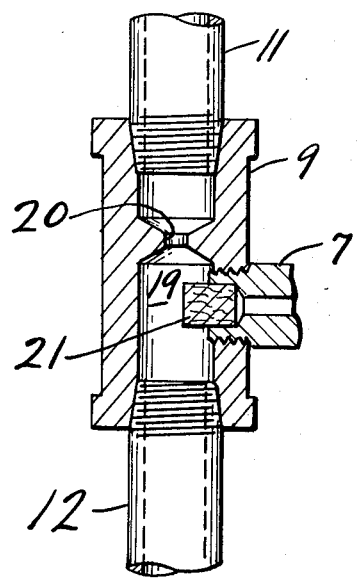
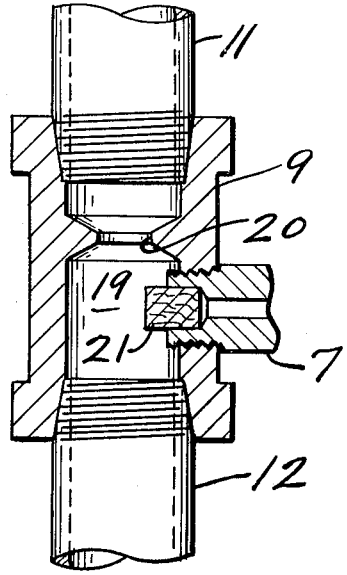
INVENTOR:
WALTER F. KUHLMAN.
BY
ATT'YS 3,516,517
AIR LUBRICATION SYSTEM
Walter F. Kuhlman, Norwalk, Ohio, assignor to Kuhlman Machine Company, Norwalk, Ohio, a corporation of Ohio
Filed Sept. 9, 1968, Ser. No. 758,427
Int. Cl. F16n 7/30
U.S. Cl. 184—55                                4 Claims

ABSTRACT OF THE DISCLOSURE

Oil from a single pressurized reservoir is supplied to each of a plurality of wick-type air line lubricators. Oil in the reservoir is pressurized by line pressure of the air, so that both pressures fluctuate together, and the proportion of air introduced by each of the lubricators is determined by the size of a fixed orifice within each lubricator.

THE PRIOR ART

Various air line lubricators have previously been suggested, for example in U.S. Pats. 2,919,769 and 3,057,433. Most prior art devices have required individual reservoirs of oil for each lubricator, and have relied upon the judgment of an operator to position a needle valve or other control device so that the lubricator provides the proper proportion of oil to air for any given tool.

In plants where large numbers of air-powered tools are used, a substantial amount of labor is required to keep an individual reservoir for each lubricator filled to a satisfactory level with oil. In addition, it has been found that operators tend to overcompensate when adjusting a lubricator control when there is either a deficiency or an oversupply of oil in the air delivered to a tool he is using. Specifically, operators frequently shut a manual control altogether when there is an oversupply of lubricant, and this practice frequently leads to damage to the tool as a consequence of operation without lubrication. Furthermore, the cost of a lubricant reservoir for each lubricator is undesirable; breakage of reservoirs is a significant cost factor; and there is a possibility of introducing dirt every time a reservoir is filled.

THE PRESENT INVENTION

The present invention is based upon the discovery of a lubrication system wherein oil from a single reservoir flows under pressure to each of a plurality of air line lubricators, and the proportion of oil introduced into air flowing through each lubricator is determined by the size of a fixed orifice, rather than by a manual control. Accordingly, the labor involved in periodic filling of each of a plurality of oil reservoirs is eliminated, as is operator control over the proportion of oil to air. Furthermore, the system does not require a plurality of reservoirs, and the chance of introducing dirt into the lubrication system is minimized.

BRIEF DESCRIPTION OF THE DRAWINGS

FIG. 1 is a partially diagrammatic view showing the lubrication system of the invention.

FIG. 2 is a vertical sectional view of an air line lubricator which is a component of the system of FIG. 1, and which services a comparatively small, air-driven tool.

FIG. 3 is a vertical sectional view of an air line lubricator which is similar to the lubricator of FIG. 2, but which services a larger air-driven tool.

DETAILED DESCRIPTION OF THE INVENTION

Referring now in more detail to the drawings, and, in particular, to FIG. 1, a lubrication system according to the invention comprises a pressurized oil reservoir 5 from which oil under pressure flows through a line 6 and inlet lines 7 through valves 8 to each of a plurality of lubricators 9. Air from a suitable supply (not illustrated) is delivered through a main air supply line 10 to each of a plurality of tool supply lines 11. Each tool supply line 11 delivers air under line pressure to one of the lubricators 9. Each of the lubricators 9 delivers an appropriate portion of oil and air to a supply line 12 and, from thence, in a conventional manner to an associated tool. Two tools 13 and 14 are shown schematically for purposes of illustration receiving a mixture of oil and air through quick disconnect fittings 15 and 16, and flexible hoses 17 and 18.

Referring now to FIGS. 2 and 3, two air line lubricators 9, which are identical, except for size, are shown. Each of the lubricators 9 is in threaded engagement with one of the tool supply lines 11 and with one of the supply lines 12, as well as with one of the oil inlet lines 7. Each of the lubricators 9 has a longitudinally extending bore 19, which is generally a continuation of the bore of the tool supply lines 11 and of the bore of the supply lines 12, but has a restricted portion forming an orifice 20. Each of the oil inlet lines 7 enters its associated lubricator 9 generally radially of the bore 19, and has a fixed wick 21 extending into the bore 19, downstream (relative to air flow) of the orifice 20.

Referring again to FIG. 1, oil delivered to each of lubricators 9 from each of the lines 7 is maintained at substantially the instantaneous air supply pressure because the instantaneous air supply pressure is imposed through a line 22 and a normally open valve 23 on an upper surface 24 of a body of oil in the reservoir 5, and because the oil surface 24 is maintained at substantially the level at which oil enters each of the lubricators 9 from its associated inlet line 7. As shown in FIG. 1, the surface 24 of oil in the reservoir 5 is maintained at the desired level, as indicated by a sight glass 25, by manual operation of valves 26 and 27, so that oil from a supply drum 28 is pumped by an air actuated pump 29 through a line 30 to the reservoir 5 as required. It will be appreciated that the oil level in the reservoir 5 could be maintained automatically, if desired, for example under the control of a float valve within the reservoir 5, or by means of a controller responsive to the difference in pressure between the oil at the bottom of the reservoir 5 and the instantaneous air pressure. Such expedients, however, usually are not warranted because, even in large installations, the total flow of oil to the several lubricators 9 is extremely small, so that manual maintenance of the desired level within the reservoir 5 does not require a significant amount of labor. As a further consequence of the extremely small flow of oil through the line 6 and air in lines 7, the pressure drop in these lines is negligible, and the oil pressure against the wicks 21 (FIGS. 2 and 3) is substantially the instantaneous air pressure.

Referring again to FIGS. 2 and 3, air passing through the orifices 20 undergoes a pressure drop. Since the wicks 21 are downstream of the orifices 20, the pressure drop caused by the orifices 20 establishes a pressure differential between the oil side and the air side of the wicks 21. The magnitude of this differential determines the rate at which oil flows through each of the wicks, and the size of each of the orifices 20 determines the magnitude of this pressure drop. Accordingly, each of the orifices 20 is sized to provide the required pressure drop and, as a consequence, the required proportion of oil to air for a particular associated tool, or for a particular type and size of associated tool. This point is illustrated by the drawings considered as a whole. For example, the lubricator 9 of FIG. 2 might be threaded to receive three-quarter inch pipe, and might have an orifice 20 one-fourth inch in diameter, while the lubricator 9 of FIG. 3 might be threaded to receive one inch pipe, and have an orifice 20 three-eighths inch in diameter. The lubricator 9 of FIG. 2, then, would provide the volume of air and proportion of oil required by a comparatively large hand tool 13, while the lubricator 9 of FIG. 3 would provide the volume of air and proportion of oil required by the still larger counterweighted tool 14. A third tool (not illustrated) might be operable from the three-quarter inch line of FIG. 2, but require a lower proportion of air than is provided by the pressure drop of the FIG. 2 lubricator 9; this tool is serviced by a lubricator (not illustrated) identical with the lubricator 9 of FIG. 2, except that it has a larger orifice 20, and conversely for a fourth tool (not illustrated) requiring a higher proportion of oil to air, a lubricator with a smaller orifice 20 is used.

In practice, lubricators 9 are fabricated in the various sizes, e.g., one-quarter inch to one inch, in which tool supply lines (11 in FIG. 1) are used, and with orifices 20 drilled to provide the maximum proportion of oil required by any tool serviced by a tool supply line having the size of the lubricator 9. The orifice 20 of that lubricator is then drilled, if necessary, in the field to provide the proportion of oil required by the particular tool to be served. The lubricator is then installed in the system, as shown in FIG. 1, and automatically provides the required proportion of oil. The valves 8 are normally open valves, and are provided solely for the use of maintenance personnel. It will be appreciated that the valves 8 could be replaced by spring loaded check valves wherein the springs would close the valves whenever there was not a pressure differential between the air side and the oil side of the wicks 21; in this arrangement, it is usually preferable for the oil pressure at the check valves to exceed slightly the instantaneous air line pressure. This can be accomplished readily in the system of the instant invention by maintaining the surface 24 of the oil in the reservoir 5 at a level higher than that of the check valves, so that the instantaneous pressure at each of the check valves is the air line pressure plus the hydrostatic pressure of the oil.

For the simplest operation of the system of the invention, it is essential that all of the lubricators 9 be mounted at substantially the same height, so that the pressure on the oil side of each of the wicks 21 is substantially the same in all of the lubricators 9. However, it is possible to size each of the orifices 20 to compensate for a pressure differential (either way) between the instantaneous air line pressure and the pressure on the oil side of each of the wicks 21, and to provide appropriate or appropriately adjustable check valves to prevent oil flow (either way) when there is no pressure drop across the orifice.

It will be apparent that various changes and modifications can be made from the specific details disclosed herein and shown in the attached drawings without departing from the spirit and scope of the invention as defined in the appended claims.

What I claim is:
1. A system for lubricating a plurality of air-powered tools, said system comprising a single closed reservoir for lubricant, means for filling said reservoir to a predetermined level with lubricant, a source of compressed air for operating the tools, means for applying to lubricant in said reservoir the pressure of said compressed air source, means for supplying compressed air from said source to each of the tools, said last-named means including a plurality of tool-supply lines, one through which the air to power each tool is delivered to that tool, an air line lubricator in each of said tool-supply lines, each lubricator having an air inlet, an air outlet, a longitudinal passage extending from the air inlet to the air outlet, a restricting orifice between the air inlet and the air outlet, a lubricant inlet providing communication from the exterior of said lubricator to the longitudinal passage between the restricting orifice and the air outlet, and flow-restricting means in the lubricant inlet effective to control the rate of lubricant flow therethrough as a direct function of the magnitude of a pressure difference thereacross, and means for withdrawing lubricant from said single reservoir and for supplying the withdrawn lubricant to the lubricant inlet of each of said lubricators at a pressure which substantially equals and which varies in direct proportion to the pressure of said compressed air source, the restricting orifice of each of said lubricators being so sized as to provide, when air flows therethrough to drive the associated tool, the pressure drop across the flow restricting means thereof which is required to enable the flow of lubricant therethrough at the rate required for proper lubrication of the associated tool.

2. A system as claimed in claim 1 wherein all of said lubricators are mounted at substantially the same height, whereby lubricant is supplied to the lubricant inlet of all of said lubricators at substantially the same pressure.

3. A system as claimed in claim 2 wherein said closed reservoir is mounted at substantially the same height as said lubricators, whereby lubricant is supplied to said lubricators at the pressure of said compressed air source.

4. A system as claimed in claim 2 wherein the height at which all of said lubricators are mounted is the same as the predetermined level in said reservoir.

References Cited
UNITED STATES PATENTS

| | | | |
|---|---|---|---|
| 1,504,341 | 8/1924 | Hansen | 184—55 |
| 1,564,820 | 12/1925 | Blanchard | 184—55 XR |
| 2,680,496 | 6/1954 | Johnson | 184—55 |
| 2,767,807 | 10/1956 | Booth | 184—55 |
| 3,447,562 | 6/1969 | Hoffman | 184—55 XR |

MANUEL A. ANTONAKAS, Primary Examiner